(12) United States Patent
Block et al.

(10) Patent No.: US 8,116,046 B2
(45) Date of Patent: Feb. 14, 2012

(54) CIRCUIT ARRANGEMENT THAT INCLUDES A DEVICE TO PROTECT AGAINST ELECTROSTATIC DISCHARGE

(75) Inventors: Christian Block, Stainz (AT); Holger Flühr, Graz (AT); Andreas Przadka, Munich (DE); Heinz Ragossnig, Friesach (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/526,278

(22) PCT Filed: Oct. 1, 2003

(86) PCT No.: PCT/DE03/03274
§ 371 (c)(1),
(2), (4) Date: Mar. 1, 2005

(87) PCT Pub. No.: WO2004/032350
PCT Pub. Date: Apr. 15, 2004

(65) Prior Publication Data
US 2005/0237684 A1  Oct. 27, 2005

(30) Foreign Application Priority Data
Oct. 2, 2002  (DE) ................ 102 46 098

(51) Int. Cl.
*H02H 9/00* (2006.01)
(52) U.S. Cl. ........................................ 361/56; 361/119
(58) Field of Classification Search ............ 361/56, 361/119; 455/78
See application file for complete search history.

(56) References Cited

U.S. PATENT DOCUMENTS

| | | | |
|---|---|---|---|
| 3,587,017 A | 6/1971 | Kurusu | |
| 3,728,731 A | 4/1973 | Choi et al. | |
| 3,934,175 A | 1/1976 | Clark | |
| 3,968,411 A * | 7/1976 | Mueller | 361/119 |
| 4,007,355 A | 2/1977 | Moreno | |
| 4,303,911 A | 12/1981 | Hulick | |
| 4,399,557 A | 8/1983 | Muszkiewicz | |
| 4,410,902 A | 10/1983 | Malik | |
| 4,525,863 A | 6/1985 | Stites | |
| 4,573,168 A | 2/1986 | Henze et al. | |
| 4,695,283 A | 9/1987 | Aldinger | |
| 4,709,233 A | 11/1987 | Duval | |
| 4,739,436 A | 4/1988 | Stefani et al. | |

(Continued)

FOREIGN PATENT DOCUMENTS

DE  3135515  6/1982

(Continued)

OTHER PUBLICATIONS

German Examination Report in corresponding German Application No. 10201434 dated Mar. 3, 2004.

(Continued)

*Primary Examiner* — Jared J Fureman
*Assistant Examiner* — Scott Bauer
(74) *Attorney, Agent, or Firm* — Fish & Richardson P.C.

(57) ABSTRACT

Circuitry includes a terminal for a high-frequency signal, at least two signal lines, a switching unit for connecting the terminal to a signal line, and a primary protection device for protecting against electrostatic discharges. The primary protection device is between the terminal and the switching unit. The primary protection device includes a first element that diverts voltages having a pulse height greater than 200V relative to a reference potential.

23 Claims, 2 Drawing Sheets

U.S. PATENT DOCUMENTS

| | | | |
|---|---|---|---|
| 4,758,805 A | 7/1988 | Yamazaki et al. | |
| 4,759,051 A | 7/1988 | Han | |
| 4,783,846 A | 11/1988 | Wachob | |
| 4,977,357 A * | 12/1990 | Shrier | 338/21 |
| 4,999,595 A | 3/1991 | Azumi et al. | |
| 5,053,910 A | 10/1991 | Goldstein | |
| 5,122,878 A | 6/1992 | Heigl et al. | |
| 5,122,921 A * | 6/1992 | Koss | 361/111 |
| 5,148,345 A | 9/1992 | Allina | |
| 5,179,731 A | 1/1993 | Trankle et al. | |
| 5,203,019 A | 4/1993 | Rinderle | |
| 5,276,422 A * | 1/1994 | Ikeda et al. | 337/28 |
| 5,321,573 A | 6/1994 | Person et al. | |
| 5,323,332 A | 6/1994 | Smith et al. | |
| 5,418,345 A | 5/1995 | Adamski | |
| 5,473,293 A | 12/1995 | Chigodo et al. | |
| 5,488,540 A | 1/1996 | Hatta | |
| 5,521,561 A * | 5/1996 | Yrjola et al. | 333/103 |
| 5,523,716 A | 6/1996 | Grebliunas et al. | |
| 5,532,897 A | 7/1996 | Carpenter | |
| 5,575,807 A | 11/1996 | Faller | |
| 5,576,920 A * | 11/1996 | Kosuga et al. | 361/56 |
| 5,583,734 A | 12/1996 | McMills et al. | |
| 5,625,894 A | 4/1997 | Jou | |
| 5,628,850 A | 5/1997 | Sanchez et al. | |
| 5,630,223 A | 5/1997 | Bahu et al. | |
| 5,675,468 A | 10/1997 | Chang | |
| 5,689,818 A | 11/1997 | Caglio et al. | |
| 5,714,900 A | 2/1998 | Ehlers | |
| 5,726,844 A * | 3/1998 | Smith | 361/56 |
| 5,742,896 A | 4/1998 | Bose et al. | |
| 5,768,690 A | 6/1998 | Yamada et al. | |
| 5,783,976 A | 7/1998 | Furutani et al. | |
| 5,815,804 A | 9/1998 | Newell et al. | |
| 5,889,308 A | 3/1999 | Hong et al. | |
| 5,896,265 A * | 4/1999 | Glaser et al. | 361/119 |
| 5,903,421 A | 5/1999 | Furutani et al. | |
| 5,914,481 A | 6/1999 | Danielson et al. | |
| 5,926,075 A | 7/1999 | Hayashi | |
| 5,982,253 A | 11/1999 | Perrin et al. | |
| 5,995,387 A | 11/1999 | Takahashi et al. | |
| 6,060,960 A | 5/2000 | Tanaka et al. | |
| 6,072,993 A * | 6/2000 | Trikha et al. | 455/78 |
| 6,100,606 A | 8/2000 | Nakahata et al. | |
| 6,100,776 A | 8/2000 | Furutani et al. | |
| 6,111,478 A | 8/2000 | Furutani et al. | |
| 6,114,848 A | 9/2000 | Suto et al. | |
| 6,236,551 B1 | 5/2001 | Jones et al. | |
| 6,243,247 B1 | 6/2001 | Akdag et al. | |
| 6,272,327 B1 * | 8/2001 | Kurchuk et al. | 455/217 |
| 6,289,204 B1 | 9/2001 | Estes et al. | |
| 6,320,547 B1 | 11/2001 | Fathy et al. | |
| 6,335,641 B1 | 1/2002 | Tougou | |
| 6,337,722 B1 | 1/2002 | Ha et al. | |
| 6,385,030 B1 * | 5/2002 | Beene | 361/119 |
| 6,407,614 B1 | 6/2002 | Takahashi | |
| 6,445,262 B1 | 9/2002 | Tanaka et al. | |
| 6,456,172 B1 | 9/2002 | Ishizaki et al. | |
| 6,512,427 B2 | 1/2003 | Nakano | |
| 6,525,346 B2 * | 2/2003 | Mizutani | 257/183 |
| 6,570,469 B2 | 5/2003 | Yamada et al. | |
| 6,590,263 B2 | 7/2003 | Gossner | |
| 6,608,547 B1 | 8/2003 | Greier | |
| 6,633,748 B1 | 10/2003 | Watanabe et al. | |
| 6,657,827 B1 | 12/2003 | Fukuda et al. | |
| 6,731,184 B1 | 5/2004 | Muto et al. | |
| 6,738,248 B1 * | 5/2004 | Jenkins et al. | 361/111 |
| 6,738,609 B1 | 5/2004 | Clifford | |
| 6,745,046 B1 | 6/2004 | Eckert et al. | |
| 6,759,925 B2 | 7/2004 | Satoh et al. | |
| 6,768,898 B2 | 7/2004 | Furutani et al. | |
| 6,795,714 B1 | 9/2004 | Fickenscher et al. | |
| 6,822,295 B2 * | 11/2004 | Larson | 257/355 |
| 6,831,528 B2 | 12/2004 | Nagata et al. | |
| 6,847,803 B1 | 1/2005 | Rauhala et al. | |
| 6,856,213 B2 | 2/2005 | Tsurunari et al. | |
| 6,987,984 B1 | 1/2006 | Kemmochi et al. | |
| 7,027,777 B2 | 4/2006 | Uriu et al. | |
| 7,027,779 B2 | 4/2006 | Tai et al. | |
| 7,057,472 B2 | 6/2006 | Fukamachi et al. | |
| 7,221,922 B2 | 5/2007 | Kemmochi et al. | |
| 7,343,137 B2 | 3/2008 | Block et al. | |
| 7,412,210 B2 | 8/2008 | Okuyama | |
| 7,471,930 B2 | 12/2008 | Okuyama et al. | |
| 7,492,565 B2 | 2/2009 | Block et al. | |
| 8,014,731 B2 | 9/2011 | Block et al. | |
| 2001/0004767 A1 | 6/2001 | Gordon et al. | |
| 2001/0027091 A1 | 10/2001 | Kimishima | |
| 2002/0080537 A1 * | 6/2002 | Landy | 361/56 |
| 2002/0090974 A1 | 7/2002 | Hagn | |
| 2002/0121668 A1 | 9/2002 | Gossner | |
| 2003/0104780 A1 | 6/2003 | Young | |
| 2003/0181174 A1 | 9/2003 | Takagi | |
| 2004/0032706 A1 | 2/2004 | Kemmochi et al. | |
| 2004/0130388 A1 | 7/2004 | Block et al. | |
| 2004/0145849 A1 | 7/2004 | Chang et al. | |
| 2004/0246168 A1 | 12/2004 | Isaji | |
| 2004/0257740 A1 | 12/2004 | Block et al. | |
| 2004/0264095 A1 | 12/2004 | Block et al. | |
| 2004/0266378 A1 | 12/2004 | Fukamachi et al. | |
| 2005/0059358 A1 | 3/2005 | Block et al. | |
| 2005/0059371 A1 | 3/2005 | Block et al. | |

FOREIGN PATENT DOCUMENTS

| | | | |
|---|---|---|---|
| DE | 3213437 | | 10/1983 |
| DE | 3626800 A | * | 2/1988 |
| DE | 36 26 800 | | 1/1990 |
| DE | 4344333 | | 7/1994 |
| DE | 68925166 | | 6/1996 |
| DE | 296 04 820 | | 7/1996 |
| DE | 19608219 | | 9/1996 |
| DE | 69515979 | | 10/2000 |
| DE | 199 19368 | | 11/2000 |
| DE | 199 31 056 | | 1/2001 |
| DE | 19944489 | | 4/2001 |
| DE | 196 49 176 | | 12/2001 |
| DE | 10201434 | | 3/2004 |
| EP | 176440 | | 4/1986 |
| EP | 0 681 365 | | 11/1995 |
| EP | 0355973 | | 12/1995 |
| EP | 0704925 | | 4/1996 |
| EP | 0784384 | | 7/1997 |
| EP | 0785590 | | 7/1997 |
| EP | 0820155 | | 1/1998 |
| EP | 1037308 | | 9/2000 |
| EP | 1073208 | | 1/2001 |
| EP | 1094538 | | 4/2001 |
| EP | 1 189 325 | | 3/2002 |
| EP | 1 233 528 | | 8/2002 |
| EP | 0 837 516 | | 1/2004 |
| GB | 877040 | | 9/1961 |
| GB | 2089173 | | 6/1982 |
| GB | 2299892 | | 10/1996 |
| JP | 48-9039 | | 2/1973 |
| JP | 50-7788 | | 3/1975 |
| JP | 52-9842 | | 1/1977 |
| JP | 53-091439 | | 7/1978 |
| JP | 62-098905 | | 5/1987 |
| JP | 64-090601 | | 4/1989 |
| JP | 2-162744 | * | 6/1990 |
| JP | 03-036924 | | 2/1991 |
| JP | 05-299209 | | 11/1993 |
| JP | 06 014454 | | 1/1994 |
| JP | 06-077707 | | 3/1994 |
| JP | 06-112850 | | 4/1994 |
| JP | 07-036548 | | 7/1995 |
| JP | 09-200077 | | 7/1997 |
| JP | 09-284168 | | 10/1997 |
| JP | 10-032521 | | 2/1998 |
| JP | 10-126281 | | 5/1998 |
| JP | 10-126307 | | 5/1998 |
| JP | 10-303314 | | 11/1998 |
| JP | 11 027168 | | 1/1999 |
| JP | 11-027177 | | 1/1999 |
| JP | 11-055156 | | 2/1999 |
| JP | 11-206012 | | 7/1999 |
| JP | 2000134945 A | * | 5/2000 |

| | | |
|---|---|---|
| JP | 2000-156651 | 6/2000 |
| JP | 2000-196495 | 7/2000 |
| JP | 2000-196496 | 7/2000 |
| JP | 2000-228060 | 8/2000 |
| JP | 2000-236201 | 8/2000 |
| JP | 2000-278168 | 10/2000 |
| JP | 2001-044883 | 2/2001 |
| JP | 2001-044884 | 2/2001 |
| JP | 2001-127663 | 3/2001 |
| JP | 2001-185902 | 7/2001 |
| JP | 2001-237372 | 8/2001 |
| JP | 2002-064401 | 2/2002 |
| JP | 2002-118487 | 4/2002 |
| JP | 2002-208873 | 7/2002 |
| SU | 502511 | 2/1976 |
| WO | WO98/47190 | 10/1998 |
| WO | WO00/46931 | 8/2000 |
| WO | WO00/57515 | 9/2000 |
| WO | WO 00/57515 * | 9/2000 |
| WO | WO02/058239 | 7/2002 |
| WO | WO03/030382 | 4/2003 |
| WO | WO03/030383 | 4/2003 |
| WO | WO03/030384 | 4/2003 |
| WO | WO03/030386 | 4/2003 |

OTHER PUBLICATIONS

Gramegna, G. et al., "A Sub-1-dB NF ±2.3-kV ESD-Protected 900-MHz CMOS LNA", IEEE Journal of Solid-State Circuits, 36(7):1010-1017 (2001).

Steyaert, M.S.J. et al., "Low-Voltage Low-Power CMOS-RF Transceiver Design", IEEE Transactions on Microwave Theory and Techniques, 50(1):281-287 (2002).

Lucero, et al "Design of an LTCC Switch Diplexer Front-End Module for GSM/DCS/PCS Applications", IEEE Radio Frequency Integrated Circuits Symposium, May 20-22, 2000, pp. 213-216.

International Norm IEC 61000-4-2, Edition 1.2, Apr. 2001.

Machine Translation of JP2001-127663 (Hayakawa), 23 pgs.

Machine Translation of JP09-284168 (Sawai Tetsuo), 13 pgs.

Machine Translation of JP2000-156651 (Katagishi Makoto), 10 pgs.

Machine Translation of JP05-299209.

Machine Translation of JP07-036548.

Machine Translation of JP09-284168.

Machine Translation of JP10-303314.

Machine Translation of JP2000-228060.

Machine Translation of JP2001-237372.

Machine Translation of Application No. JP2000-236201.

Action and Response History retrieved for U.S. Appl. No. 10/490,753, through Jan. 26, 2009.

Action and Response History retrieved for U.S. Appl. No. 10/490,914, through Jan. 26, 2009.

Action and Response History retrieved for U.S. Appl. No. 10/490,930, through Jan. 26, 2009.

Action and Response History retrieved for U.S. Appl. No. 10/490,711, through Jan. 26, 2009.

Action and Response History retrieved for U.S. Appl. No. 10/466,338, through Jan. 26, 2009.

English Translation of Int'l Preliminary Examination Report for Application No. PCT/DE2002/003665, dated Sep. 2, 2003.

English Translation of Int'l Preliminary Examination Report for Application No. PCT/DE2002/00129, dated Feb. 6, 2003.

English Translation of Examination Report in Application No. JP62-098905, dated Apr. 5, 2007.

English Translation of Examination Report in Application No. JP62-098905, dated May 31, 2007.

English Translation/Summary of German Examination Reports in Application No. 102 01 434, dated Feb. 3, 2003 and Sep. 8, 2006.

Examination Report in German Application No. DE10201435.3, dated Sep. 1, 2008.

English Translation of Examination Report in Japanese Application No. 2003-533457, dated Jun. 19, 2008.

Int'l Search Report in Application No. PCT/DE03/03274, dated Apr. 2, 2004.

Examination Report in German Application No. DE10246098.1, dated Oct. 14, 2005.

Examination Report in Japanese Application No. 2000-558612, dated Feb. 14, 2008.

Action and Response History retrieved for U.S. Appl. No. 10/490,753, through Apr. 21, 2009.

Updated Action and Response History retrieved for U.S. Appl. No. 10/490,753, through Aug. 17, 2009.

Updated Action and Response History retrieved for U.S. Appl. No. 10/466,338, through Aug. 17, 2009.

Action and Response History retrieved for U.S. Appl. No. 10/490,753, through Feb. 15, 2011.

Action and Response History retrieved for U.S. Appl. No. 10/466,338, through Feb. 17, 2011.

Pieters et al., "High-Q Integrated Spiral Inductors for High Performance Wireless Front-End Systems", in IEEE Radio and Wireless Conf., Denver, CO, (2000), pp. 251-254.

Action and Response History retrieved for U.S. Appl. No. 10/490,753, through Dec. 21, 2010.

Action and Response History retrieved for U.S. Appl. No. 10/466,338, through Dec. 21, 2010.

Benz et al "Spannungs, Licht-und Magnetfeldabhangige Widerstande" Tabellenbuch Radio-und Fernsehtechnik, Funkelektronik, S. 130, 135, 286 XP-002232831, 1993.

TVSF0603 "FemtoFarad",Polymer ESD Suppressor, Microsemi, 2000.

Machine Translation of Japanese Publication No. 06-112850 (Pub. Date Apr. 1994).

Machine Translation of Japanese Publication No. 2000-278168 (Pub. Date Oct. 2000).

Machine Translation of Japanese Publication No. 06-077707 (Pub. Date Mar. 1994).

Machine Translation of Japanese Publication No. 11-027177 (Pub. Date Jan. 1999).

Machine Translation of Japanese Publication No. 10-126307 (Pub. Date May 1998).

Machine Translation of Japanese Publication No. 09-200077 (Pub. Date Jul. 1997).

Machine Translation of Japanese Publication No. 2000-196495 (Pub. Date Jul. 2000).

Machine Translation of Japanese Publication No. 2000-196496 (Pub. Date Jul. 2000).

Machine Translation of Japanese Publication No. 10-032521 (Pub. Date Feb. 1998).

Machine Translation of Japanese Publication No. 11-055156 (Pub. Date Feb. 1999).

Machine Translation of Japanese Publication No. 2001-185902 (Pub. Date Jul. 2001).

Machine Translation of Japanese Publication No. 2002-118487 (Pub. Date Apr. 2002).

Machine Translation of Japanese Publication No. 2002-208873 (Pub. Date Jul. 2002).

Machine Translation of Japanese Publication No. 2002-064401 (Pub. Date Feb. 2002).

Action and Response History retrieved for U.S. Appl. No. 10/466,338, through Aug. 18, 2011.

Action and Response History retrieved from U.S. Appl. No. 10/490,753, through Jul. 19, 2011.

* cited by examiner

CIRCUIT ARRANGEMENT THAT INCLUDES A DEVICE TO PROTECT AGAINST ELECTROSTATIC DISCHARGE

TECHNICAL FIELD

This patent application relates to a circuit arrangement having a switching unit, which is connected to a terminal for a high-frequency signal. Moreover, the switching unit is connected to additional signal leads. The terminal of the circuit arrangement is connected to a protection device against electrostatic discharges.

BACKGROUND

Circuit arrangements are often used as multiband frontend modules for mobile telephones. For example, they are connected to the antenna of the mobile telephone at the antenna input. If a user carrying an electrical charge contacts the antenna, this may result in an electrostatic discharge (ESD). Such electrostatic discharges may produce voltage spikes capable of destroying the circuit arrangement. Consequently, it is necessary to equip circuit arrangements of the type mentioned above with a protection device against ESD.

In high-frequency sections of mobile telephones, among other things, components are used that are sensitive to electrostatic discharges. Such components are, for example, surface acoustic wave filters, gallium arsenide switches, PIN diodes, amplifiers or the like. They may be irreversibly destroyed by the action of high-frequency high voltage pulses such as those produced by ESD. These problems are just as relevant to discrete gallium arsenide switches and frontend modules with integrated gallium arsenide switches as they are to frontend modules with pin switching technology and integrated surface wave filters. These problems also concern the ESD-sensitive components that are used in the transmission/reception paths of the high-frequency section. This complicates use in mobile telephones, as a result of which electrostatic discharges directly to the antenna input of the gallium arsenide switch or frontend module are possible in external, accessible antennas, for external antennas on a car. Many manufacturers of mobile telephones therefore require that the frontend modules or gallium arsenide switches have ESD resistance in compliance with standard IEC61000-4-2 in the magnitude of 8 kV at the system level.

Circuit arrangements that are equipped with a protection device against ESD are known from the publication WO 00/57515. The protection device is designed as an electric high pass filter, to which a capacitor is connected in series with the antenna input path and an inductance is connected in parallel.

The high pass filter to protect the circuit arrangement has the disadvantage that the function of the protective element is frequency-dependent. All frequency components of a signal are passed through nearly unhindered from a specific limit frequency. All other frequency components are suppressed. The result of this frequency-dependent operating mode is that very many frequencies that are not desired in a mobile telephone are still allowed through. For example, frequencies between approximately 1 and 2 GHz are used in mobile telephones according to the GSM, PCN or PCS standard. All other frequencies received by the antenna are likely to be interfering and must therefore be filtered out.

SUMMARY

Described herein is a circuit arrangement in which the protective device against electrostatic discharges is enhanced.

A circuit arrangement is described which has a terminal for a high-frequency signal. Furthermore, the circuit arrangement has at least two additional signal leads. In addition, a switching unit is provided which is used to connect the terminal to one of the signal leads. Furthermore, a primary protection device is provided which is connected between the terminal and the switching unit. The protection device includes a voltage limitation element which diverts voltage pulses exceeding a switching voltage to a reference potential.

The circuit arrangement has the advantage that the diversion of the interfering signals caused by ESD is no longer frequency-dependent. Instead, the interfering signals are detected based on their voltage elevation and diverted to the reference potential. To that end, it is advantageous to use a voltage limitation element having a very low resistance above a switching voltage. Below the switching voltage, the voltage limitation element has a very high resistance so that signals below the switching voltage pass unhindered from the terminal to the switching unit and can be connected to a signal lead from there. On the other hand, voltage pulses whose voltage elevation is greater than the switching voltage are detected reliably and diverted to the reference potential.

It is thus possible to advantageously prevent voltage pulses that are not in the useful range of the circuit arrangement and have a very high, interfering voltage elevation from reaching the switching unit unhindered.

A suitable selection of the switching voltage can make it possible to divert to the reference potential only those signals that are greater than those of the circuit arrangement, for example, signals used to transfer information. This makes it possible top reliably block interfering signals whose voltage elevation exceeds the carrying capacitance or the maximum intended load of the circuit arrangement on reaching the switching unit.

The reference potential may be a ground potential, for example. However, it should be noted that in the case of mobile telephones, for example, there is no ground in the classical sense, but instead only a local ground, which essentially plays the role of a reference potential but may not be considered an infinitely good diversion for charge carriers.

In one embodiment of the circuit arrangement, a protection device is provided whose insertion loss is less than 0.3 dB. Such a protection device has the advantage that processing of the useful signals in the circuit arrangement is hardly interfered with, so that, for example, when the mobile telephone is used, it is possible to dispense with the use of unnecessarily powerful amplifiers, which can improve both the standby operating time and the transmission quality of the information.

In one embodiment of the circuit arrangement, the voltage limitation element has a capacitance lower than 1 pF. This can make the parasitic capacitance of the voltage limitation element low enough to prevent an interference of the useful signals or the useful signals from being too strongly attenuated.

For example, a gallium arsenide double diode is suitable as a voltage limitation element.

Such a double diode may be integrated in the circuitry of the circuit arrangement in such a way that the primary protection device contains a lead that connects the terminal to the switching unit. The lead is connected to the reference potential via the voltage limitation element. This results in the voltage limitation element being connected virtually in parallel to the signal lead.

In another embodiment of the circuit arrangement, a second protective element is connected in parallel to the first voltage limitation element. In this case, it is advantageous if a capacitor is also connected to the lead in series between the protective elements.

The second protective element may be, for example, a spark gap. The use of a spark gap is in particular advantageous because it can be easily integrated in a ceramic multilayer substrate, making it possible to improve the integration level of the circuit arrangement advantageously. The spark gap is in particular suitable if the switching unit contains pin diodes.

Combining the first voltage limitation element with a second protective element makes it possible to subdivide the protective effect of the protection device into a coarse protection and a fine protection. If a gallium arsenide double diode is used for the first voltage limitation element, this may be considered a fine protection for the circuit arrangement. Accordingly, the second protective element may assume the function of the coarse protection. In this connection, the term coarse protection refers to currents of up to 30 A being capable of flowing through the relevant protective element. Accordingly, lower currents should flow through the voltage limitation element that represents the fine protection.

In another embodiment of the circuit arrangement, the second protective element may be a polymer suppressor. In this polymer suppressor, an additional electrically conductive polymer is embedded in a spark gap, the polymer changing its electrical conductivity with the applied voltage.

In another embodiment of the circuit arrangement, the second protective element may be an overvoltage component whose parasitic capacitance does not exceed 1 pF. Such a limit for the capacitance is advantageous because it simultaneously limits the maximum insertion loss for the second protective element.

A varistor may be considered, for example, as an overvoltage component.

In another embodiment of the circuit arrangement, an inductive element is provided as the second protective element. It is advantageous if the inductive element is greater than 18 nH. In this case, the second protective element has an adequately low insertion loss.

In addition to the gallium arsenide double diode, any other overvoltage component whose parasitic capacitance is lower than 1 pF and has a switching voltage lower than 200 V is suitable for the first voltage limitation element. Advantageously, a first voltage limitation element with a switching voltage lower than 100 V is used. The lower the switching voltage of the first voltage limitation element, the more effectively can sensitive components of the circuit arrangement be protected against excessively high voltage pulses. However, it must be considered that the useful signals that are used by the circuit arrangement, for example, to transfer information or speech must also have a specific minimum signal elevation, which may, of course, not be included the switching voltage of the first voltage limitation element in order to prevent the transmission of the signals or speech from being deteriorated by the second protective element.

Furthermore, an overvoltage component whose insertion loss is lower than 0.3 dB may be considered as a first voltage limitation element.

In another embodiment of the circuit arrangement, one or a plurality of control leads is provided to control the switch position of the switching unit. Each control lead is advantageously, but not necessarily, connected to a secondary protection device against high voltages.

This embodiment of the circuit arrangement has the advantage that it is also possible to effectively suppress interference from the control leads. In addition to the interference pulse entering the circuit arrangement directly via the terminal, an electrostatic discharge may also generate a high voltage at the circuit arrangement via a ground coupling or via a coupling through the common reference potential. This may result, for example, from the control input ordinarily used in a switch being either at a high potential or at a low potential. The high potential is defined in that it is, for example, 2.3 V higher than the ground potential of the circuit arrangement. Because, in a mobile telephone, just as in many other devices based on signal transmission using antennas, the signal insertion passes from the antenna to the system ground, in the case of a circuit arrangement mentioned above, it is also possible to cause an electrostatic discharge directly to the ground potential of the circuit arrangement. Via the direct coupling of a control lead to ground via the condition "high," the voltage pulse arising from an electrostatic discharge may also act on the circuit arrangement via the control lead in addition to the path via the antenna.

In one embodiment of the circuit arrangement, a supply lead is provided for an operating voltage. The supply lead is advantageously, but not necessarily, connected to a secondary protection device against electrostatic discharges. That which has already been described above concerning the control leads also applies to possible interference potentials at the supply lead.

In an embodiment of the circuit arrangement, two field effect transistors are provided in the switching unit. Each break distance of each field effect transistor connects the terminal to a signal lead. Each gate of each field effect transistor is connected to a control lead. Furthermore, each gate is connected to a secondary protection device against electrostatic discharges.

Each of the cited secondary protection devices may include a voltage limitation element having a switching voltage lower than 100 V. A varistor or also a Zener diode, for example, may be considered for this purpose.

In order to facilitate the diversion of interference impulses to the common reference potential, the particular voltage limitation elements of the secondary protection devices are connected to the reference potential.

A circuit arrangement in which the terminal is the antenna input of a mobile telephone is cited as a special embodiment of the circuit arrangement. The use of the circuit arrangement in a mobile telephone is suggested in particular in this case.

To this end, it is also advantageous if the signal leads form the transmission/reception paths of a mobile telephone.

It is furthermore advantageous if the switching unit includes a gallium arsenide switch. Such gallium arsenide switches are in particular favorable with regard to power consumption, as well as being very fast.

In another embodiment of the circuit arrangement, the switching unit and the primary protection device as well as the secondary protection device, if necessary, may be integrated in a multilayer ceramic substrate. This can increase the integration level of the circuit arrangement very effectively, which is of advantage in mobile applications in mobile radio telephony in particular.

The various embodiments are explained in greater detail with reference to associated figures.

DESCRIPTION OF THE DRAWINGS

In the figures, it should be noted that elements that are similar to one another or perform the same function are denoted by identical reference symbols.

DETAILED DESCRIPTION

Figure 1:
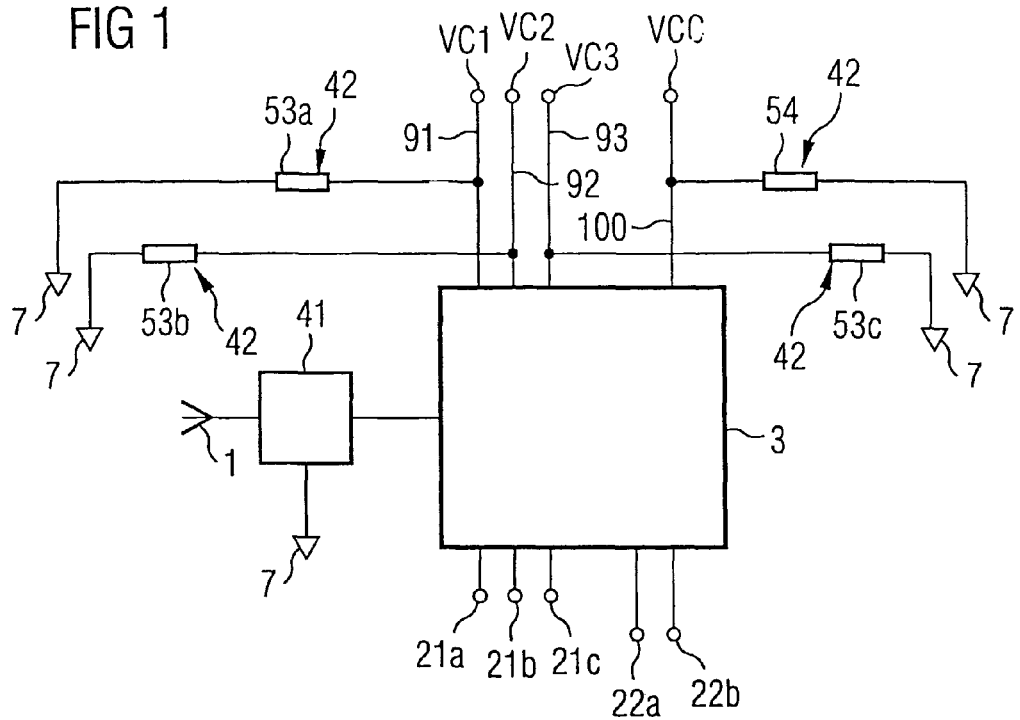
FIG. 1 shows an example of a circuit arrangement in a schematic representation.

FIG. 1 shows a circuit arrangement having a terminal 1, which is suitable as an input or output for a high-frequency signal. In addition, a switching unit 3 is provided, which optionally connects terminal 1 to one of signal leads 21a, 21b, 21c, 22a, 22b.

A primary protection device 41 connected to reference potential 7 is provided between terminal 1 and switching unit 3. Control leads 91, 92, 93 are provided for the control of switching unit 3. Control voltages VC1, VC2, VC3 are applied to control leads 91, 92, 93. Each of control leads 91, 92, 93 is connected to a secondary protection device 42. Each of protection devices 42 is connected to reference potential 7. Secondary protection devices 42 are formed by voltage limitation elements 53a, 53b, 53c. These may be, for example, varistors or Zener diodes. The use of a multilayer varistor having a switching voltage lower than 100 V is considered in particular. Furthermore, a supply lead 100 is provided which supplies operating voltage VCC to switching unit 3 and is also provided with a secondary protection device 42 in the form of a voltage limitation element 54. Secondary protection devices 42 are needed in particular when switching unit 3 contains a gallium arsenide switch. In the event that switching unit 3 contains 3 PIN diodes, secondary protection devices 42 may be dispensed with. Signal leads 21a, 21b, 21c may, for example, be assigned to the Rx paths for the reception of signals of a mobile telephone. Accordingly, signal lines 22a, 22b in the Tx path may be assigned for sending radio telephony signals of a mobile telephone.

Switching unit 3 may also be a ceramic multilayer component containing a gallium arsenide switch and, in addition, passive components for implementing frequency filters.

External terminal 1 may be used as a high-frequency signal input or as a high-frequency signal output. Particular consideration is given to conducting the GSM signals typically used in mobile telephones into switching unit 3 via external terminal 1 or to send them from switching unit 3 to the outside via terminal 1.

Figure 2:
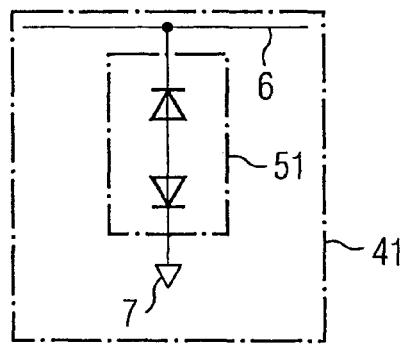
FIG. 2 shows an exemplary embodiment of the primary protection device in a schematic representation.

FIG. 2 shows a detailed representation of primary protection device 41 of FIG. 1. It is indicated here, for example, how primary protection device 41 may be designed. In the example of FIG. 2, primary protection device 41 has a lead 6. Lead 6 connects terminal 1 to switching unit 3. Lead 6 is connected to a voltage limitation element 51. In the example of FIG. 2, it is a gallium arsenide double diode and is designed as an nppn diode. Such a diode has the advantage that it can be manufacture to have a switching voltage lower than 100 V. Furthermore, it is possible to manufacture such double diodes to have an insertion loss less than 0.1 dB. Furthermore, it is possible to manufacture double diodes of this type to have a parasitic capacitance less than 0.1 pF. Since, according to FIG. 2, voltage limitation element 51 is in a parallel circuit to lead 6, the total capacitance of voltage limitation element 51 contributes to the parasitic capacitance. Voltage limitation element 51 is connected to reference potential 7. Furthermore, it is also conceivable to use a pnnp double diode instead of the nppn double diode.

In particular, a gallium arsenide double diode having a switching voltage between 30 and 100 V is used as voltage limitation element 41.

Figure 2A:
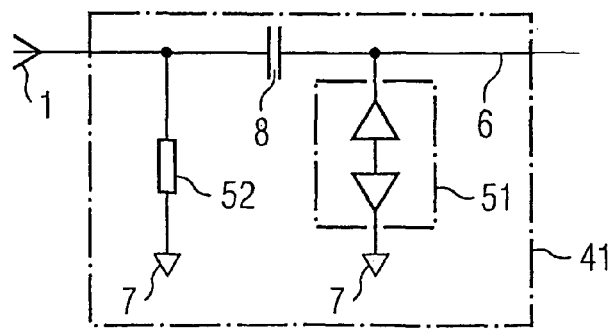
FIG. 2a shows another exemplary embodiment of the primary protection device in a schematic representation.

According to FIG. 2A, another embodiment is shown for primary protection device 41. In addition to voltage limitation element 51, another protective element 52 is provided. It is now not necessary for protective element 52 to be a component having a very low resistance above a switching voltage and a very high resistance below the switching voltage. The protective element can also perform its protective function as a current limitation. The protective function of component 52 is based on the fact that it connects lead 6 to reference potential 7, as a result of which a finite flow of current is connected between terminal 1 and reference potential 7 in any case. Consequently, it may also be assumed here that protective element 52 limits the current load of voltage limitation element 51. Protective element 52 may be, for example, a spark gap; see also FIG. 4 in this regard. However, it may also be a polymer suppressor. Furthermore, a coil is taken into consideration, the inductance of which is greater than 18 nH. In these cases, it is advantageous, in addition to the two protective elements 51, 52, also to connect a capacitor 8 between the two protective elements 51, 52 in series to lead 6.

This results in an LC component that is formed from the coil and capacitor 8. By an adequate selection of the capacitance, which should be greater than 22 pF and is 47 pF in one exemplary embodiment of the circuit arrangement, it is possible for the LC component to have an insertion loss less than 0.1 dB, which is in the frequency range of interest today for mobile radiotelephony. In the embodiment shown in FIG. 2A, protective element 52 has an inductance of 56 nH in the form of an inductor (see also FIG. 3). In one embodiment of the circuit arrangement according to FIG. 2, in conjunction with FIG. 1, it is possible to specify a circuit arrangement that is RF-compatible for frequencies between 0 and 2 GHz and which simultaneously, according to Standard IEC61000-4-2, can effectively suppress ESD pulses up to 8 kV to below the error threshold of the components shown otherwise in the figures.

Voltage limitation elements 53a, 53b, 53c, 54 should have a switching voltage lower than 100 V. They may have a switching voltage that is lower than 10 V. The switching voltages may be selected here to be lower than in terminal 1 because the voltages occurring here normally do not significantly exceed the customary operating voltages of 5 V. In contrast, voltages of up to 30 V can occur at terminal 1 when a mobile telephone is operated.

Figure 3:
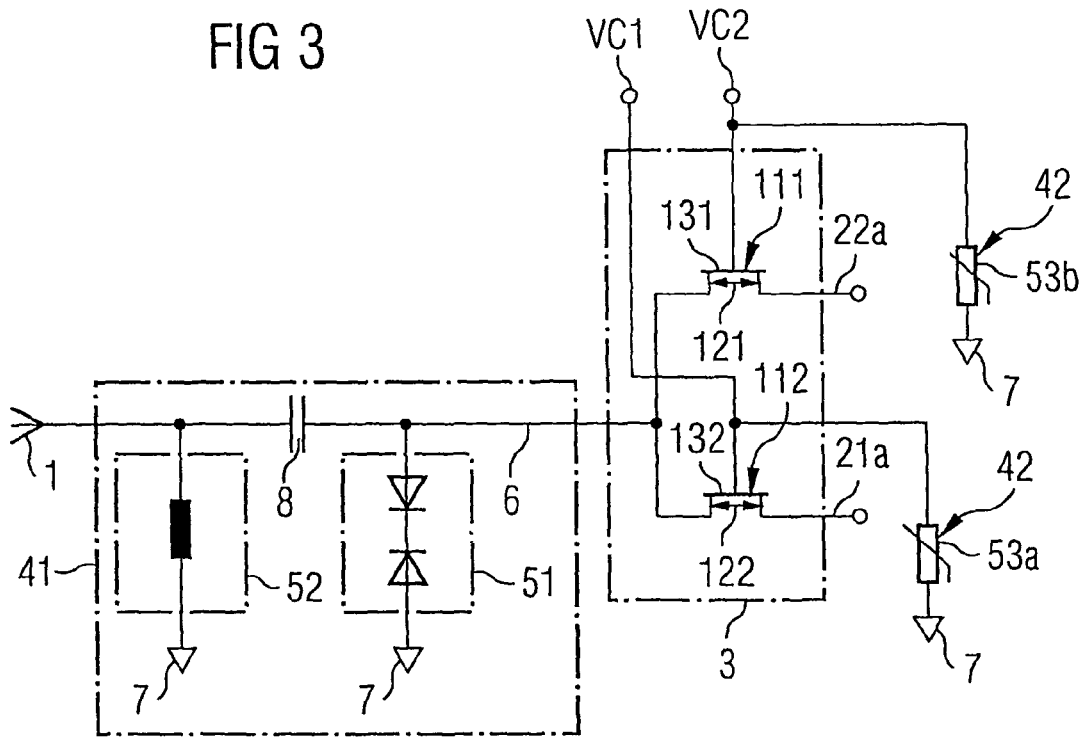
FIG. 3 shows another example of the circuit arrangement in a schematic representation.

FIG. 3 shows another embodiment for a circuit arrangement in which a protective element 52, which is a coil, is provided for primary protection device 41. This makes it simple to implement the inductance already discussed in FIG. 2A.

Furthermore, FIG. 3 shows the internal structure of an exemplary switching unit 3. Two field effect transistors 111, 112 are provided. Each field effect transistor 111, 112 has a break distance 121, 122, which can be switched through or also blocked via the corresponding gate 131, 132. Break distance 121, 122 connects terminal 1 to a signal lead 21a, 22a. Each gate 131, 132 is connected to a control voltage VC1, VC2. Furthermore, each gate 131, 132 is connected to a secondary protection device 42, which, in the example of FIG. 3, is a varistor as the voltage limitation element. Each of the varistors is for its part connected to reference potential 7. It may also be seen from FIG. 3 that instead of the nppn double diode of FIG. 2 and FIG. 2A, the use of a pnnp double diode in primary protection device 41 is also considered.

Field effect transistors 111, 112 that are shown in FIG. 3 may also be, for example, a gallium arsenide switch. Accordingly, it is advantageous if field effect transistors 111, 112 are designed based on gallium arsenide.

Furthermore, the exemplary switching unit may also contain more than two field effect transistors. In this case, each gate of each transistor must be connected to a secondary protection device.

With a maximum signal voltage of approximately 30 V generated in the mobile telephone when double diodes are used, the characteristics of the diode itself make a switching voltage of approximately 30 to 60 V necessary.

Figure 4:
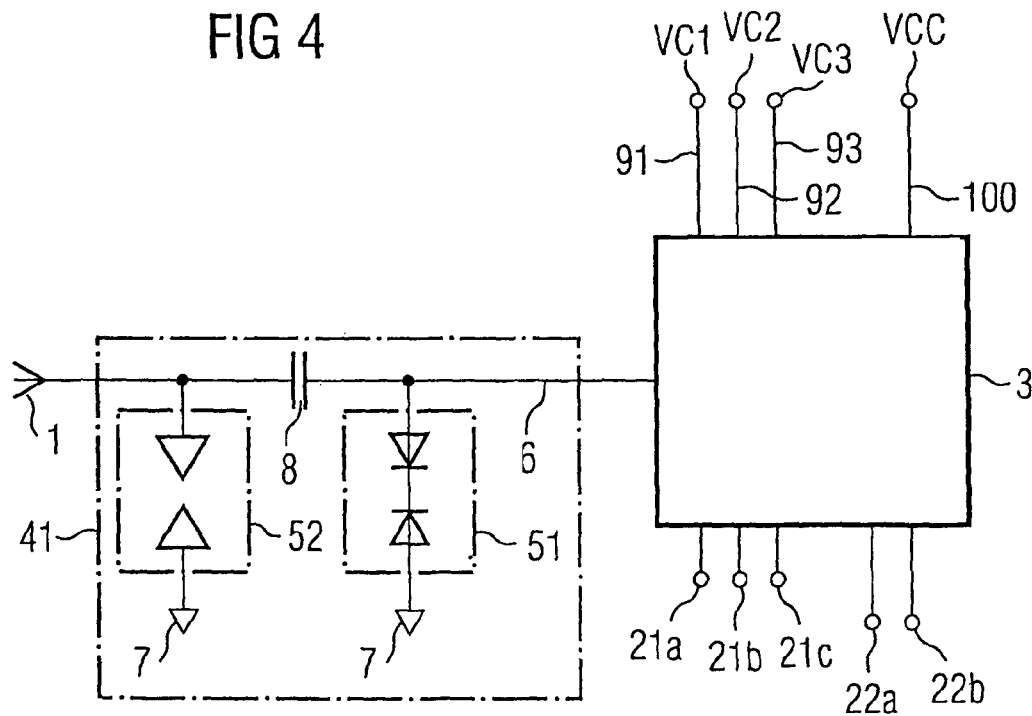
FIG. 4 shows another example of the circuit arrangement in a schematic representation.

FIG. 4 shows another embodiment of the circuit arrangement in which a spark gap is selected for protective element 52. Also, when a spark gap is used, it is advantageous in addition to provide a capacitor 8, which is connected to line 6 according to FIG. 2A and FIG. 3. The use of a spark gap as protective element 52 is advantageous in particular when PIN diodes are provided in switching unit 3 to switch the signals from terminal 1 to signal leads 21a, 21b, 21c, 22a, 22b.

The described circuitry is not limited to mobile telephones; instead, it may be used in any circuit arrangement in which high-frequency signals occur and in which a protection against electrostatic discharges is necessary.

What is claimed is:

1. Circuitry for use in a mobile telephone, the circuitry comprising:
   a terminal for use with a high-frequency signal;
   at least two signal lines;
   a switching unit for connecting the terminal to a signal line; and
   a primary protection device for protecting against electrostatic discharges, the primary protection device being between the terminal and the switching unit, the primary protection device comprising a first element that diverts all voltages having a magnitude greater than 200V along a same path to a reference potential.

2. The circuitry of claim 1, wherein the first element has an insertion attenuation that is less than 0.3 dB.

3. The circuitry of claim 1, wherein the first element has a capacitance that is less than 1 pF.

4. The circuitry of claim 1, wherein the first element comprises a gallium arsenide double diode.

5. The circuitry claim 1, wherein the primary protection device comprises a circuit path that connects the terminal and the switching unit; and
   wherein the first element connects the circuit path to the reference potential.

6. The circuitry of claim 1, further comprising:
   a second element that is in parallel with the first element, the second element for limiting a current load of the first element.

7. The circuitry of claim 6, further comprising:
   a capacitor on a circuit path between the first element and the second element.

8. The circuitry of claim 6, wherein the second element comprises is a discharger.

9. The circuitry of claim 6, wherein the second element comprises a polymer suppressor.

10. The circuitry of claim 6, wherein the second element comprises an over-voltage component having a capacitance that is less than 1 pF.

11. The circuitry of claim 6, wherein the second element comprises an inductive element having an inductance that is greater than 18 nH.

12. The circuitry of claim 1, further comprising:
    circuit paths that provide control signals to the switching unit, each of the circuit paths comprising a secondary protection device for protecting against electrostatic discharges.

13. The circuitry of claim 1, further comprising:
    a circuit path for supplying for an operating voltage to the switching unit, the circuit path comprising a secondary protection device for protecting against electrostatic discharges.

14. The circuitry of claim 1, wherein the switching unit comprises field effect transistors, a contact break distance of each of the field effect transistors connecting the terminal to a signal line; and
    wherein the circuitry further comprises:
      circuit paths that connect to gates of the field effect transistors, the circuit paths for providing control signals to the gates, each of the circuit paths comprising a secondary protection device for protecting against electrostatic discharges.

15. The circuitry of claim 12, 13 or 14, wherein the secondary protection device comprises a voltage-limiting element having a switching voltage that is less than 100 V.

16. The circuitry of claim 15, wherein the voltage-limiting element comprises a varistor.

17. The circuitry of claim 15, wherein the voltage-limiting element comprises a Zener diode.

18. The circuitry of claim 14, wherein at least one secondary protection device is connected to the reference potential.

19. The circuitry of claim 1, wherein the switching unit comprises PIN diodes.

20. The circuitry of claim 1, wherein the switching unit comprises a gallium arsenide switch.

21. The circuitry of claim 1, wherein the terminal comprises an antenna input of a mobile telephone.

22. The circuitry of claim 1, wherein the signal lines comprises transmitting and receiving paths of the mobile telephone.

23. The circuitry of claim 1, wherein the switching unit and the primary protection device are integrated into a multi-layer ceramic substrate.

* * * * *